United States Patent
Hassan (10) Patent No.: US 8,954,816 B2
(45) Date of Patent: Feb. 10, 2015

(54) ERROR CORRECTION CODING (ECC) DECODE OPERATION SCHEDULING

(75) Inventor: Yoseph Hassan, Ashkelon (IL)

(73) Assignee: Sandisk Technologies Inc., Plano, TX (US)

( * ) Notice: Subject to any disclaimer, the term of this patent is extended or adjusted under 35 U.S.C. 154(b) by 242 days.

(21) Appl. No.: 13/305,199

(22) Filed: Nov. 28, 2011

(65) Prior Publication Data

US 2013/0139021 A1   May 30, 2013

(51) Int. Cl.
*H03M 13/00* (2006.01)
(52) U.S. Cl.
USPC .......................................................... 714/752
(58) Field of Classification Search
USPC ................................................. 714/776, 752
See application file for complete search history.

(56) References Cited

U.S. PATENT DOCUMENTS

| | | | |
|---|---|---|---|
| 7,434,138 B2 | 10/2008 | Lin et al. | |
| 7,577,891 B2 | 8/2009 | Farjadrad et al. | |
| 8,006,172 B2 | 8/2011 | Boyer et al. | |
| 2004/0045003 A1 | 3/2004 | Lake | |
| 2004/0117566 A1* | 6/2004 | McClannahan et al. | 711/154 |
| 2007/0150798 A1* | 6/2007 | Shieh et al. | 714/785 |
| 2009/0063899 A1* | 3/2009 | Jordan et al. | 714/17 |
| 2011/0126079 A1* | 5/2011 | Wu et al. | 714/763 |
| 2011/0252294 A1* | 10/2011 | Ng et al. | 714/804 |
| 2011/0255360 A1* | 10/2011 | Takahashi | 365/219 |
| 2011/0283165 A1* | 11/2011 | Nishiyama | 714/773 |
| 2012/0020233 A1* | 1/2012 | Lee et al. | 370/252 |
| 2012/0272121 A1* | 10/2012 | Woo et al. | 714/763 |

* cited by examiner

*Primary Examiner* — Ajay Bhatia
*Assistant Examiner* — Thien D Nguyen
(74) *Attorney, Agent, or Firm* — Toler Law Group, PC (57) ABSTRACT

A method includes receiving, at an error correction coding (ECC) controller, information indicating one or more data chunks to be decoded, populating a schedule according to an order of decoding of the data chunks, and initiating decode of the data chunks according to the schedule.

32 Claims, 8 Drawing Sheets

ERROR CORRECTION CODING (ECC) DECODE OPERATION SCHEDULING

FIELD OF THE DISCLOSURE

The present disclosure is generally related to decoding error correction coding (ECC) data.

BACKGROUND

Non-volatile data storage devices, such as universal serial bus (USB) flash memory devices, removable storage cards, or solid state drives (SSD), have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. Although increasing the number of bits per cell and reducing device feature dimensions may increase a storage density of a memory device, a bit error rate of data stored at the memory device may also increase.

Error correction coding (ECC) is often used to correct errors that occur in data read from a memory device. Prior to storage, data may be encoded by an ECC encoder to generate redundant information (e.g. "parity bits") that may be stored with the data. As more parity bits are used, an error correction capacity of the ECC increases and a number of bits required to store the encoded data also increases. An ECC decoder can be complex and challenging to design, debug, and implement.

Multi-phase ECC can include a first phase of ECC decoding using a reduced set of parity bits for individual chunks of data and a second phase of ECC decoding using a larger set of parity bits. The larger set of parity bits can be used for more powerful decoding of a chunk that is not decodable using the reduced set of parity bits. The larger set of parity bits need not be stored for each individual chunk of data but may instead by generated for one or more chunks based on other chunks that have been successfully decoded. Because of the multiple decoding phases, implementation of a multi-phase ECC decoder can be more complex and more challenging to design, implement, and debug than a single-phase ECC decoder.

SUMMARY

An ECC decode controller may populate a schedule of one or more data chunks to be decoded. For example, data may be read from a memory and may include one or more portions or "chunks" to be decoded. Each chunk can correspond to encoded data that may have one or more errors. The ECC decode controller may populate the schedule according to a decoding order of the chunks and may initiate decoding of the chunks according to the schedule. To illustrate, the schedule may have a stack configuration, a stack-on-stack configuration, a first-in-first-out (FIFO) configuration, or any combination thereof.

DETAILED DESCRIPTION

Figure 1:
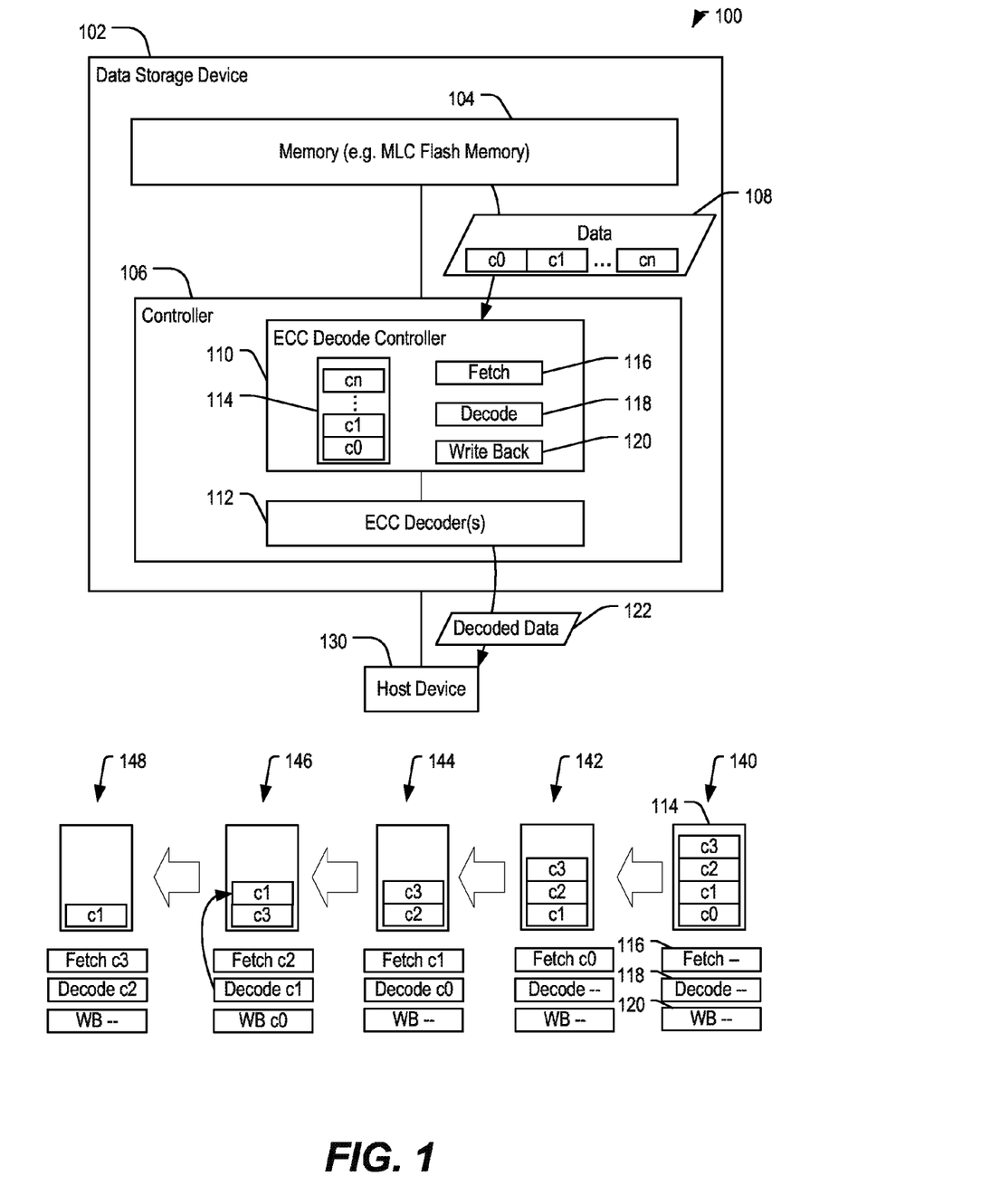
FIG. 1 is a diagram of a particular embodiment of a system that includes a schedule-based ECC decode controller.

Referring to FIG. 1, a particular illustrative embodiment of a system that can perform schedule-based ECC decoding is depicted and generally designated 100. The system 100 includes a data storage device 102 coupled to a host device 130. The data storage device 102 includes a memory 104 coupled to a controller 106. The controller 106 includes an ECC decode controller 110 that controls ECC decoding according to a schedule 114.

The host device 130 may be configured to provide data to be stored at the memory 104 or to request data to be read from the memory 104. For example, the host device 130 may include a mobile telephone, a music or video player, a gaming console, an electronic book reader, a personal digital assistant (PDA), a computer, such as a laptop computer, a notebook computer, or a tablet, any other electronic device, or any combination thereof.

The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be a solid state drive (SSD) or may be embedded memory in the host device 130, such as eMMC® (trademark of JEDEC Solid State Technology Association, Arlington, Va.) memory and eSD memory, as illustrative examples.

The memory 104 may be a nonvolatile memory of a flash device, such as a NAND flash device, a NOR flash device, or any other type of flash device. The memory 104 includes multiple storage elements, such as memory cells of a multi-level cell (MLC) memory.

The controller 106 may be configured to receive memory access requests from the host device 130 and to process data 108 read from the memory 104. The data 108 may include one or more portions or "chunks," such as chunks c0, c1, ... cn. Each chunk in the data 108 may correspond to an ECC codeword, including data and parity bits, that is decodable independently of the other data chunks in the data 108. For example, the controller 106 may be configured to receive a request for data in a particular data chunk, such as the data chunk c1, and may read the data 108 to retrieve the data chunk c1 from the memory 104 for decoding. The controller 106 may be configured to provide requested decoded data 122 to the host device 130.

The controller 106 includes the ECC decode controller 110 and an ECC decoder (or multiple ECC decoders) 112. The ECC decode controller 110 is configured to populate the schedule 114 according to a decode order of one or more data chunks of the read data 108. The ECC decode controller 110 is configured to initiate and control decoding of the data chunks according to the schedule 114 in a pipelined decode operation that includes a fetch stage 116, a decode stage 118, and a write back stage 120.

The ECC decoder(s) 112 may include a low-density parity check (LDPC) decoder. Alternatively, or in addition, the ECC decoder(s) 112 may include one or more other types of decoders, such as a Reed-Solomon decoder, a Bose Chaudhuri Hocquenghem (BCH) decoder, a Turbo Code decoder, another type of decoder, or any combination thereof. The ECC decoder(s) 112 are responsive to the decode stage 118 to operate on a data chunk indicated by the ECC decode controller 110.

During operation, the host device 130 may send a request to the data storage device 102 for data stored at the memory 104. For example, the host device 130 may request data stored at chunks c0, c1, c2, and c3 of the data 108.

The controller 106 may instruct the memory 104 to retrieve the data 108, including the requested data chunks c0-c3. The data 108 may be read from the memory 104 during a read operation and provided to the controller 106. The controller 106 may provide the data 108 to the ECC decode controller 110.

The ECC decode controller 110 may populate the schedule 114 according to a decode order of the data 108. As illustrated in a first decode cycle 140, the ECC decode controller 110 may populate the schedule 114 in a stack configuration, with data chunk c0 as a bottom entry of the stack and data chunk c3 as a top entry of the stack. Upon populating the schedule 114, and prior to initiating pipeline decoding operation, the fetch stage 116, the decode stage 118, and the write back stage 120 are idle.

In a second decode cycle 142, the entry at the bottom of the stack in the schedule 114, corresponding to data chunk c0, has been provided to the fetch stage 116. The fetch stage 116 may issue instructions to cause the data chunk c0 to be written into a memory to be accessible to one or more of the ECC decoders 112. The decode stage 118 and the write back stage 120 remain idle during the second decode cycle 142.

In a third decode cycle 144, the decode stage 118 initiates decode processing of the c0 data chunk. To illustrate, the decode stage 118 may send an instruction to one or more of the ECC decoders 112 indicating a portion of memory for processing the c0 data chunk and indicating one or more processing parameters, such as a decoding type or an ECC decoding parameter. A bottom stack entry corresponding to the data chunk c1 has been popped from the stack in the schedule 114 and has been provided to the fetch stage 116. The fetch stage 116 causes the retrieval of the c1 data chunk to be accessible for ECC decoding at one or more of the ECC decoders 112.

During a fourth decode cycle 146, the write back stage 120 causes the ECC decoded data for the data chunk c0 to be written to a system memory to be available as decoded data. Similarly, the decode stage 118 operates on the data chunk c1, such as by instructing one or more of the ECC decoders 112 to access the portion of memory into which the data chunk c1 was fetched, to perform an ECC decode operation on the data chunk c1. As illustrated, decoding of the data chunk c1 may result in an ECC decoding error, such as when a number of bit errors occurring in the data chunk c1 have exceeded an ECC correction capability of the ECC scheme used during decoding of the data chunk c1 in the decode stage 118. As a result, an entry corresponding to the data chunk c1 may be re-inserted in the schedule 114 for additional processing after the last requested data chunk c3 has been processed. An example of performing a secondary ECC decode operation on one or more data chunks having failed a first ECC decode operation is described in further detail with respect to FIGS. 3-5.

Also during the fourth decode cycle 146, an entry at the bottom of the stack of the schedule 114 has been popped from the stack and provided to the fetch stage 116. Thus, during the fourth decode cycle 146, each of the pipeline stages 116-120 processes sequential data chunks popped from the schedule 114 according to an order of the data chunks appearing in the schedule 114.

At a fifth decode cycle 148, an entry corresponding to the final requested data chunk c3 has been popped from the schedule 114 into the fetch stage 116. The decode stage 118 instructs decode operations of the data chunk c2 at one or more of the ECC decoders 112. The write back stage 120 may be idle, due to decoding of the data chunk c1 having resulted in an ECC error condition.

As a result of the ECC decode controller 110 populating the schedule 114 according to a decode order, an observation of decode operations within the ECC decode controller 110 may be accomplished with reduced complexity. To illustrate, debugging an operation of the ECC decode controller 110 may be assisted by determining contents of each entry in the schedule 114 and tracking a position of each entry that is loaded into the schedule 114 and each entry that is removed from the schedule 114 and provided to the ECC decoding pipeline stages 116-120.

Figure 3:
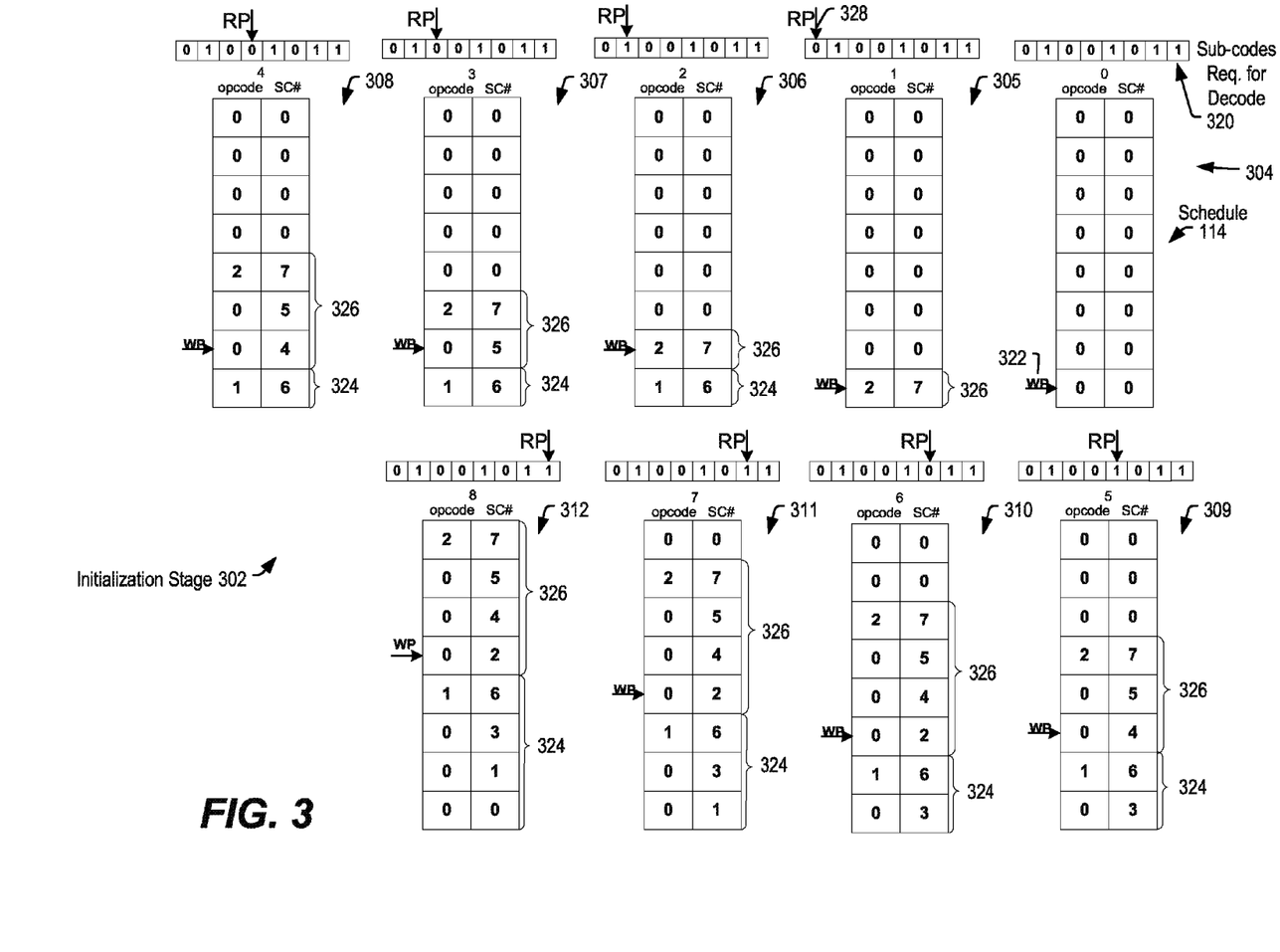
FIG. 3 is a diagram that illustrates a particular embodiment of populating a schedule of the schedule-based ECC decode controller of FIG. 2.
Figure 4:
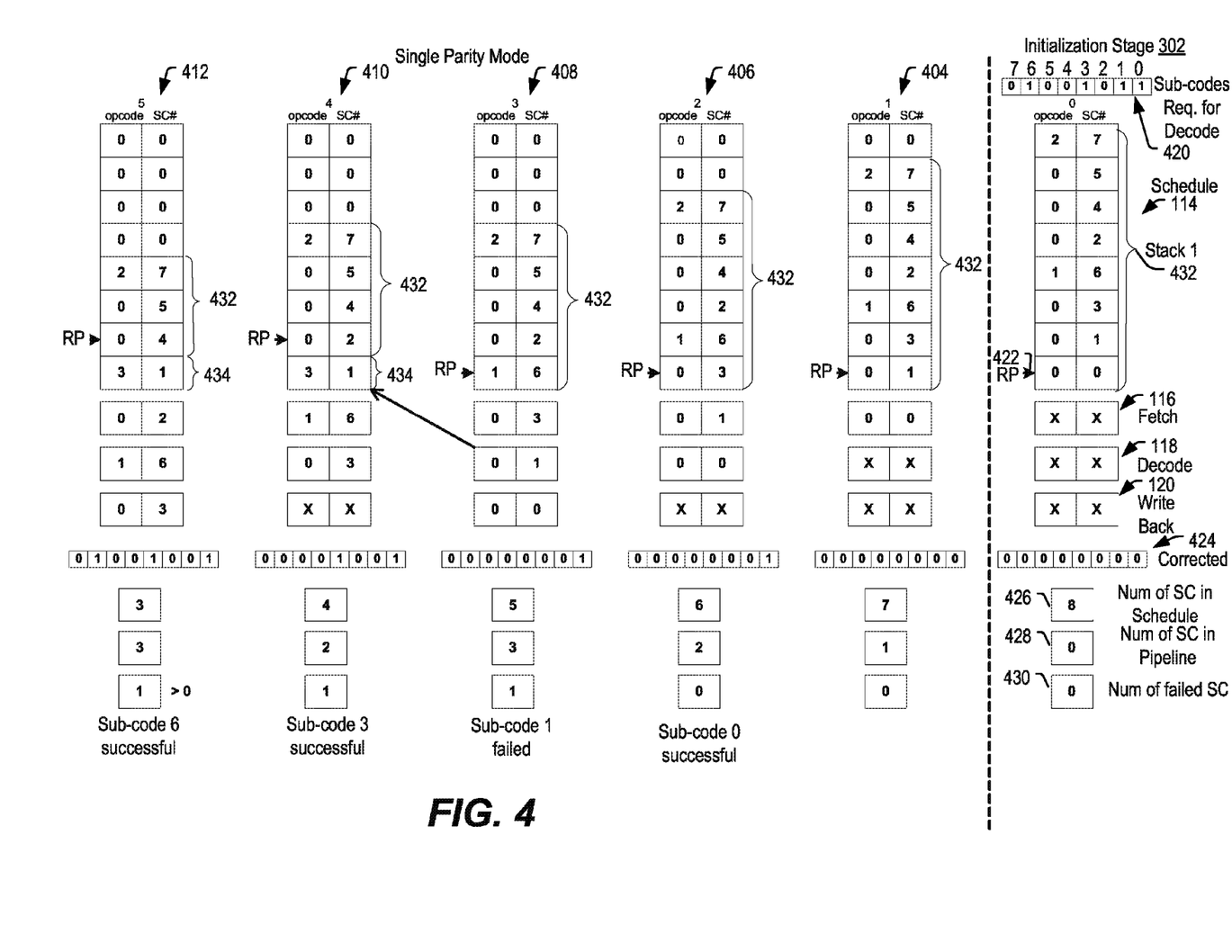
FIG. 4 is a diagram that illustrates a particular embodiment of operation of the schedule-based ECC decode controller of FIG. 2 after populating the schedule of FIG. 3.

Complexity may be reduced due to the ECC decode controller 110 performing a single-pass initialization of the schedule 114 by maintaining a dedicated data structure, such as a stack, as illustrated in FIG. 1, or a stack-on-stack, as described with respect to FIGS. 3-4. The data structure may be dynamic and may be efficiently maintained via movement of associated stack pointers, as described with respect to FIGS. 3-5. An example of a single-pass initialization is described with respect to FIG. 6.

The ECC decode controller 110 may be self-initialized and self-sustained during an entire decoding process. For example, the ECC decode controller 110 may control decode operations independent of intervention from a central processing unit (CPU) of the controller 106. The ECC decode controller 110 may be implemented by hardware (e.g. dedicated circuitry) or program instructions executed by a dedicated processor, or a combination of hardware and processor-executed instructions. The ECC decode controller 110 may support a scalable decoder architecture with multiple decoders and multiple dedicated ECC memories, such as illustrated in FIG. 2.

Figure 2:
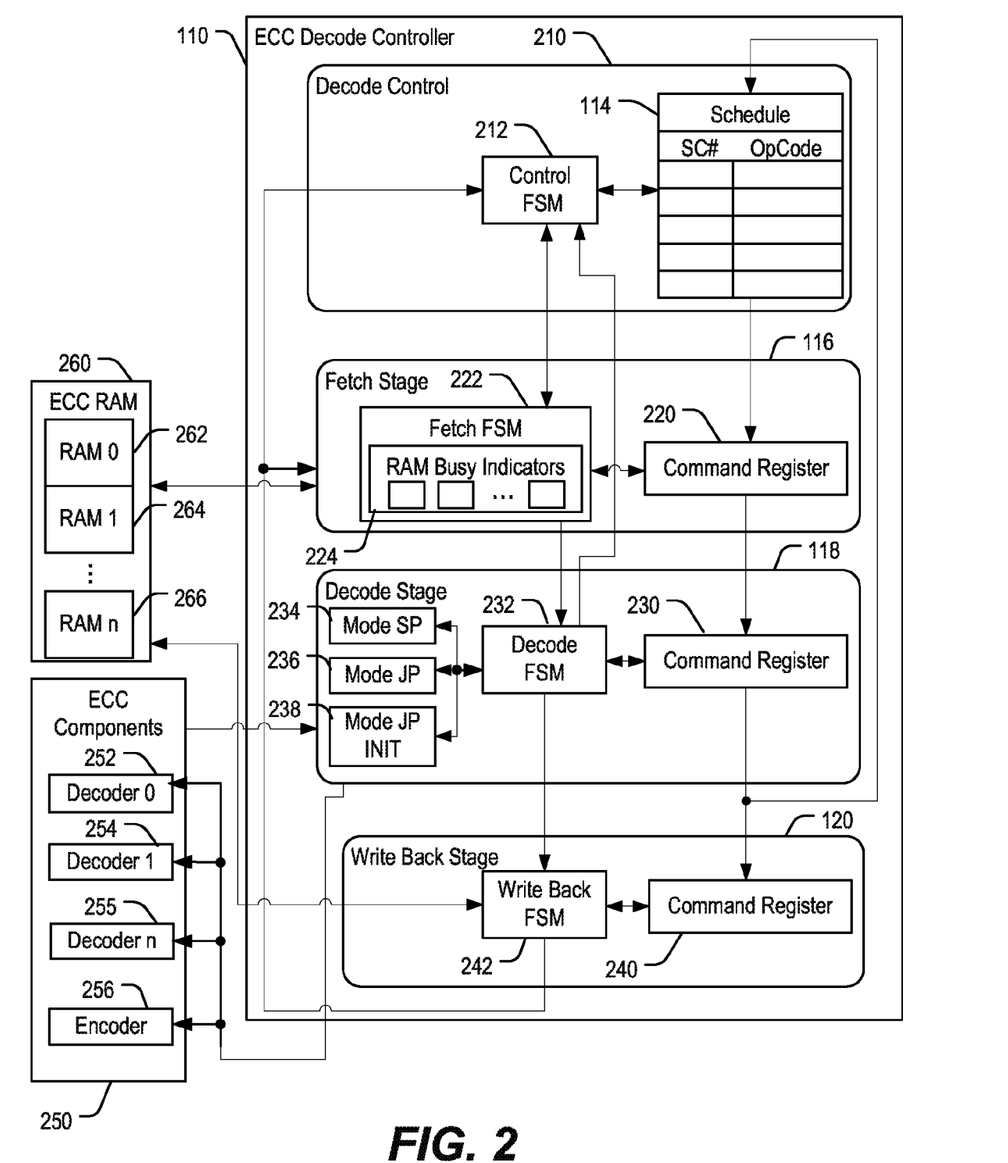
FIG. 2 is diagram of a particular embodiment of the schedule-based ECC decode controller of FIG. 1 in a pipelined, multi-phase decoding implementation.

Referring to FIG. 2, a particular embodiment of the ECC decode controller 110 of FIG. 1 is depicted. The ECC decode controller 110 is illustrated as including a decode control portion 210, the fetch stage 116, the decode stage 118, and the write back stage 120. One or more of the components 210, 116, 118, and 120 of the ECC decode controller 110 are configured to communicate with a memory, such as an ECC random access memory (RAM) 270, and one or more other ECC components 250. For example, the ECC components 250 may include one or more ECC decoders, such as a first decoder 252, a second decoder 254, one or more other decoders up to an $n^{th}$ decoder 255, and an ECC encoder 256.

The decode control 210 includes the schedule 114 that is accessible to a control finite state machine (FSM) 212. The schedule 114 is illustrated as including, for each entry (i.e. each horizontal row of the schedule 114) a sub-code number (SC#) and an operational code corresponding to the sub-code number (OpCode). The control finite state machine 212 may be configured to populate the schedule 114 according to decode order of one or more data chunks, to control removal of entries from the schedule 114 for decode operations, and to control addition of other entries to the schedule 114, such as in response to an ECC decode failure during the decode stage 118.

The fetch stage 116 includes a fetch finite state machine 222 coupled to a command register 220. The command register 220 is configured to receive a command corresponding to an entry of the schedule 114 indicating a next data chunk to be fetched for ECC processing. The fetch finite state machine 222 includes a set of RAM busy indicators 224. To illustrate, the ECC RAM 260 may include a first RAM portion 262, a second RAM portion 264, and one or more other RAM portions, up to an nth RAM portion 266. The fetch stage 116 may be configured to parse the received command in the command register 220 and initiate a data chunk data transfer from a system RAM to the ECC RAM 260.

To illustrate, the fetch stage 116 may be configured to fetch a data chunk to be decoded to one or more of the RAM portions 262-266 for processing by one or more of the ECC components 250. The RAM busy indicators 224 may indicate which of the RAM portions 262-266 are currently unavailable for addition of new data due to decoding or write back operations. The fetch finite state machine 222 may be configured to access the RAM busy indicators 224 to locate an available RAM portion of the ECC RAM 260 and may cause a fetch of the data chunk indicated in the command register 220 to be loaded to the identified RAM portion of the multiple RAM portions 262-266. The fetch stage 116 may generate a command to be provided to the decode stage 118.

The decode stage 118 is illustrated as including a command register 230 coupled to a decode finite state machine 232. The decode finite state machine 232 is further coupled to multiple mode indicators, including a single parity mode indicator (mode SP) 234, a joint parity mode indicator (mode JP) 236, and a joint parity initialization mode indicator (mode JP NIT) 238. The decode stage 118 is configured to receive, from the fetch stage 116, a command into the command register 230. The received command may be accessed and parsed by the decode finite state machine 232 to determine decode instructions for the data chunk corresponding to the command. The decode finite state machine 232 may further be configured to receive from the fetch finite state machine 222 an indication of a particular RAM portion 262-266 storing the data chunk to be decoded. The decode finite state machine 232 may access one or more of the mode indicators 234-238 corresponding to a decoding mode of operation for the data chunk indicated in the command register 230.

The decode finite state machine 232 may be configured to instruct one or more of the ECC components 250 to begin processing at the designated RAM portion 262-266. For example, when the data chunk is a data chunk to be decoded that includes data and parity bits within the data chunk, the single parity mode indicator 234 may be provided to the first decoder 252, in addition to an indication of a RAM portion, such as the second RAM portion 264, to cause the first decoder 252 to perform a single parity decode operation of the data chunk stored at the second RAM portion 264. Results of ECC processing at the designated ECC components 250 are provided to the decode stage 118 and may be used to determine further operation of the decode finite state machine 232. The decode stage 118 may generate a command to be provided to the write back stage 120. The decode finite state machine 232 may be configured to provide to the fetch stage 116 when decoding had failed, an indication that the second RAM portion 264 is no longer busy and is available to receive other data for storage by the fetch stage 116.

The write back stage 120 includes a command register 240 coupled to a write back finite state machine 242. The write back finite state machine 242 may be configured to access a command that has been received in the command register 240 and to cause data stored in the ECC RAM 260 to be written to the system memory. To illustrate, the command received in the command register 240 may correspond to a data chunk having decoded data in the second RAM portion 264 (after having been successfully decoded by the first decoder 252). The write back finite state machine 242 may cause the data in the second RAM portion 264 to be written to a system memory. The write back finite state machine 242 may be configured to provide to the fetch stage 116 an indication that the second RAM portion 264 is no longer busy and is available to receive other data for storage by the fetch stage 116. The write back finite state machine 242 may further be configured to provide a status to the decode control 210. The write back finite state machine 242 may further be configured to provide a decoding status to a system CPU.

Operation of the system illustrated in FIG. 2 is described with reference to FIGS. 3-6. FIG. 3 illustrates an initialization stage 302 where the schedule 114 is populated in a single pass of a control register 320 that indicates whether each sub-code is requested or non-requested. The control register 320 is populated with a bit pattern corresponding to sub-codes of a received data word, such as the data chunks c0-cn of the received data 108 of FIG. 1, that are requested to be decoded. For example, data that is read from the memory 104 may correspond to an ECC codeword that further includes multiple ECC sub-codes. Each ECC sub-code is decodable using a parity within the sub-code and is also decodable using a joint parity that is more powerful in error correction capability. The joint parity can be generated by processing all of the data chunks in the read data, rather than just the requested sub-codes. As illustrated, a "1" bit in an entry of the control register 320 indicates the corresponding sub-code is requested for decode, and a "0" bit in an entry indicates the corresponding sub-code is not requested for decode. As illustrated, sub-codes 0, 1, 3, and 6 in the received data are requested for decode and sub-codes 2, 4, 5, and 7 are not requested for decoding.

At an initial stage 304, the schedule 114 is initialized to all-zero values for the opcode and sub-code number for each entry. In stages 306-312, the schedule 114 is populated in a stack-on-stack data structure, with a first stack 324 of entries corresponding to sub-codes requested to be decoded (i.e. having a "1" bit in the control register 320) and a second stack 326 of entries correspond to sub-codes not requested to be decoded (i.e. having a "0" bit in the control register 320). Requested sub-codes are written to address '0' (a lowest entry in the schedule 114 and the bottom of the first stack 324). A write pointer 322 points to the bottom of the second stack 326 and indicates a position into which a next non-requested sub-code entry is to be added to the schedule 114.

At a first stage 305, an entry is added to the schedule 114 corresponding to sub-code 7 based on a value of a high-order bit of the control register 320 indicated by a read pointer 328. The entry is added at the write pointer 322 as a first entry of the second stack 326 in response to a "0" bit at the read pointer 328 indicating that sub-code 7 is not requested to be decoded.

The entry has an opcode of 2, indicating a last entry in the schedule 114, and having a sub-code number of 7 (i.e. a "2 7" entry).

At a second stage 306, the read pointer 328 is updated and a "1 6" entry corresponding to sub-code 6 is added at address '0' as the lowest entry in the schedule 114 (i.e. at the bottom of the first stack 324). The "1 6" entry is added to the first stack 324 based on a "1" bit at the read pointer 326. The sub-code "1" indicates a last sub-code in the schedule 114 requested for decoding. The second stack 326 is pushed up due to the new entry in the first stack 324. The write pointer 322 indicating the bottom of the second stack 326 is shifted with the second stack 326.

At a third stage 307, the read pointer 328 is updated and a "0 5" entry is added to the schedule 114 corresponding to sub-code 5. The "0 5" entry is added to the second stack 326 at the write pointer 322 based on a "0" bit at the read pointer 328. At a fourth stage 308, the read pointer 328 is updated and a "0 4" entry is added to the second stack 326 at the write pointer 322 based on a "0" bit at the read pointer 328.

At a fifth stage 309, the read pointer 328 is updated and a "0 3" entry is added to the first stack 324 based on a "1" bit at the read pointer 328. At a sixth stage 310, a "0 2" entry is added to the second stack 326 based on a "0" bit at the read pointer 328. At a seventh stage 311, a "0 1" entry is added to the first stack 324 based on a "1" bit at the read pointer 328, and at an eighth stage 312, a "0 0" entry is added to the first stack 324 based on a "1" bit at the read pointer 328

As illustrated in FIG. 3, the schedule 114 can be populated using a stack-on-stack configuration of the stacks 324 and 326. A single pass of the control register 320 may be performed to populate all entries in the schedule 114 in a decoding order suitable for multi-phase decoding, as described with respect to FIGS. 4-6. The ECC decoder including the schedule 114 may be self-sustaining, i.e. the ECC decoder may populate the schedule 114 independent of intervention from an application processor and may also perform multi-phase decoding autonomously. Although the examples provided in FIGS. 3-7 illustrate eight sub-codes, in other embodiments more than eight or less than eight sub-codes may be used according to an ECC code structure.

FIG. 4 illustrates decode processing including the initialization stage 302 of FIG. 3 in a pipeline initialization cycle. The schedule 114 is illustrated as a data structure that is populated and maintained in a stack configuration. As illustrated, the sub-code numbers corresponding to the sub-codes to be decoded are indicated in entries at the bottom of a combined stack 432 (i.e. the entries of the first stack 324 of FIG. 3) and sub-codes not requested for decode are indicated in entries at the top of the combined stack 432 (i.e. the entries of the second stack 326 of FIG. 3). The stack 432 includes a bottom entry corresponding to the sub-code 0, a next entry for sub-code 1, a next entry for sub-code 3, and a next entry for sub-code 6. After the requested sub-codes, the combined stack 432 includes an entry for the sub-code 2, an entry for sub-code 4, an entry for sub-code 5, and an entry for sub-code 7.

Each entry in the schedule 114 includes a corresponding opcode. An opcode having a value of 0 indicates a regular sub-code, i.e. standard processing may be used with the sub-code. An opcode having a value of 1 may correspond to a last requested sub-code. For example, the fourth entry of the combined stack 432 has an opcode of 1, indicating a final entry to be processed of the requested sub-codes. An opcode having a value of 2 may indicate that the corresponding entry is a final entry (corresponding to a last sub-code) in the schedule 114. For example, the top entry (the entry corresponding to sub-code 7), has an opcode of 2. Each opcode/sub-code pair is referred to as an "operation command." For example, the bottom entry of the schedule 114 is the operation command "0 0."

During the initialization cycle 302, the fetch stage 116 is idle, the decode stage 118 is idle, and the write back stage 120 is idle. A register 424 includes bits indicating whether or not a corresponding sub-code has been corrected. The register 424 is initialized to all 0 values, indicating that none of the sub-codes of the received data have been corrected.

A first indicator 426 indicates the number of sub-codes in the scheduler (i.e. a number of sub-codes in the schedule 114), initialized to the value 8. A second indicator 428 indicates a number of sub-codes currently being processed in the pipeline (i.e. in the fetch stage 116, in the decode stage 118, and in the write back stage 120). The second indicator 428 is initialized to 0. A third indicator 430 indicates a number of failed sub-codes (i.e. a number of sub-codes where an ECC decode operation has resulted in an ECC decode failure). The third indicator 430 is initialized to 0.

Decode processing of the sub-codes indicated and initialized in the initialization cycle 302 begins at a first pipeline cycle 404. In the first pipeline cycle 404, a first operation command "0 0" (i.e. corresponding to the first entry in the first stack 332) is popped from the schedule 114 at the read pointer 422 and provided to the fetch stage 116. The first indicator 426 of sub-codes in the schedule 114 is reduced from 8 to 7 and the second indicator 428 of the number of sub-codes in the pipeline is incremented from 0 to 1.

At a second pipeline cycle 406, the operation command "0 0" is passed to the decode pipeline stage 118 and a second operation command "0 1" is popped from the schedule 114 at the read pointer 422 and provided to the fetch stage 116. The first indicator 426 is reduced from 7 to 6 and the second indicator 428 is increased from 1 to 2. Decoding in the second pipeline cycle 406 of sub-code 0 is successful, and a 0-order bit of the register 424 is set to 1, indicating that sub-code 0 is successfully decoded.

At a third pipeline cycle 408, the operation command "0 0" is passed to the write back stage 120. The operation command "0 1" is passed to the decode stage 118. The operation command "0 3" is popped from the schedule 114 at the read pointer 422 and is provided to the fetch stage 116. The first indicator 426 is decremented from 6 to 5 and the second indicator 428 is incremented from 2 to 3. As illustrated, decoding of sub-code 1 (i.e. the operation command "0 1") fails in the third pipeline cycle 408. As a result, the third indicator 430 is increased to 1, indicating there has been one failed sub-code. The failed operation command "0 1" is pushed back into the schedule 114 as the new opcode "3 1." The stack read pointer 422 is incremented by 1, to point to a bottom entry of the combined stack 432.

By pushing the failed decode operation "0 1" back into the schedule 114, a stack-over-stack data structure is created in the schedule 114. For example, the combined stack 432 indicating sub-codes remaining to be processed is pushed over a third stack 434 indicating sub-codes that have failed. The read pointer 422 continues to point to a lowest entry of the combined stack 432.

In a fourth pipeline cycle 410, the write back stage 120 is idle because no results from decoding the "1 0" operation command exist to be written back to system memory. The decode stage 118 processes the "0 3" operator command of the third sub-code to be processed. The fetch stage 116 receives the operation command "1 6" from bottom of the combined stack 432, indicated by the read pointer 422. The read pointer 422 points to a second entry in the schedule 114, to show that a next sub-code to pop from the schedule 114 is to be popped from the combined stack 432 and not from the third stack 434.

Decoding of sub-code 3 may be successful during the fourth pipeline cycle 410, resulting in a 1 value being written into bit position 3 of the register 424. The first indicator 426 is reduced to 4, indicating that four sub-codes remain to be decoded (the return of failed sub-code 1 to the schedule 114 does not increment the first indicator 426). The second indicator 428 is reduced to 2, indicating that two sub-codes are in the pipeline stages 116-120, and the third indicator 430 remains at 1, indicating that a single sub-code has failed.

Advancing to a fifth pipeline cycle 412, the write back stage 120 has received the operation command "0 3" from the decode stage 118. The decode stage 118 has received the operation command "1 6" from the fetch stage 116. The fetch stage 116 has been populated with the operation command "0 2" from the bottom of the combined stack 432, as indicated by the read pointer 422. The read pointer 422 points to the bottom of the combined stack 432 at an operation command "0 4".

Decoding of the operation code "1 6" at the decode stage 118 (indicating decoding of sub-code 6 of the received data) is successful during the fifth pipeline cycle 412. As a result, the register 424 is updated to show a 1 value at bit position 6. The first indicator 426 is decremented to 3, the second indicator 428 is incremented to 3, and the third indicator 430 remains at 1. Because the operation code "1 6" corresponds to a last requested sub-code to be processed, as indicated by the opcode 1, a determination may be made whether decode processing of the non-requested sub-codes should be performed. For example, if all requested sub-codes have been successfully decoded, decode processing for non-requested sub-codes 2, 4, 5, and 7 may be unnecessary. Entries corresponding to sub-codes 2, 4, 5, and 7 may be flushed from the pipeline and the schedule 114. However, because the third indicator 430 has a non-zero value in the example of FIG. 3, additional processing is to be performed in a second processing mode.

To illustrate, the second processing mode may include generation of joint parity bits to enable a higher error correction capability so that a second decode operation may be performed of sub-code 1. If sub-code 1 has a number of errors that may be corrected by the higher error correction capability, then sub-code 1 may be successfully decoded using the joint parity bits. However, to generate the joint parity bits, the remaining sub-codes that have not been requested for decoding may be decoded. Decode processing of the non-requested sub-codes is illustrated in FIG. 5.

Figure 5:
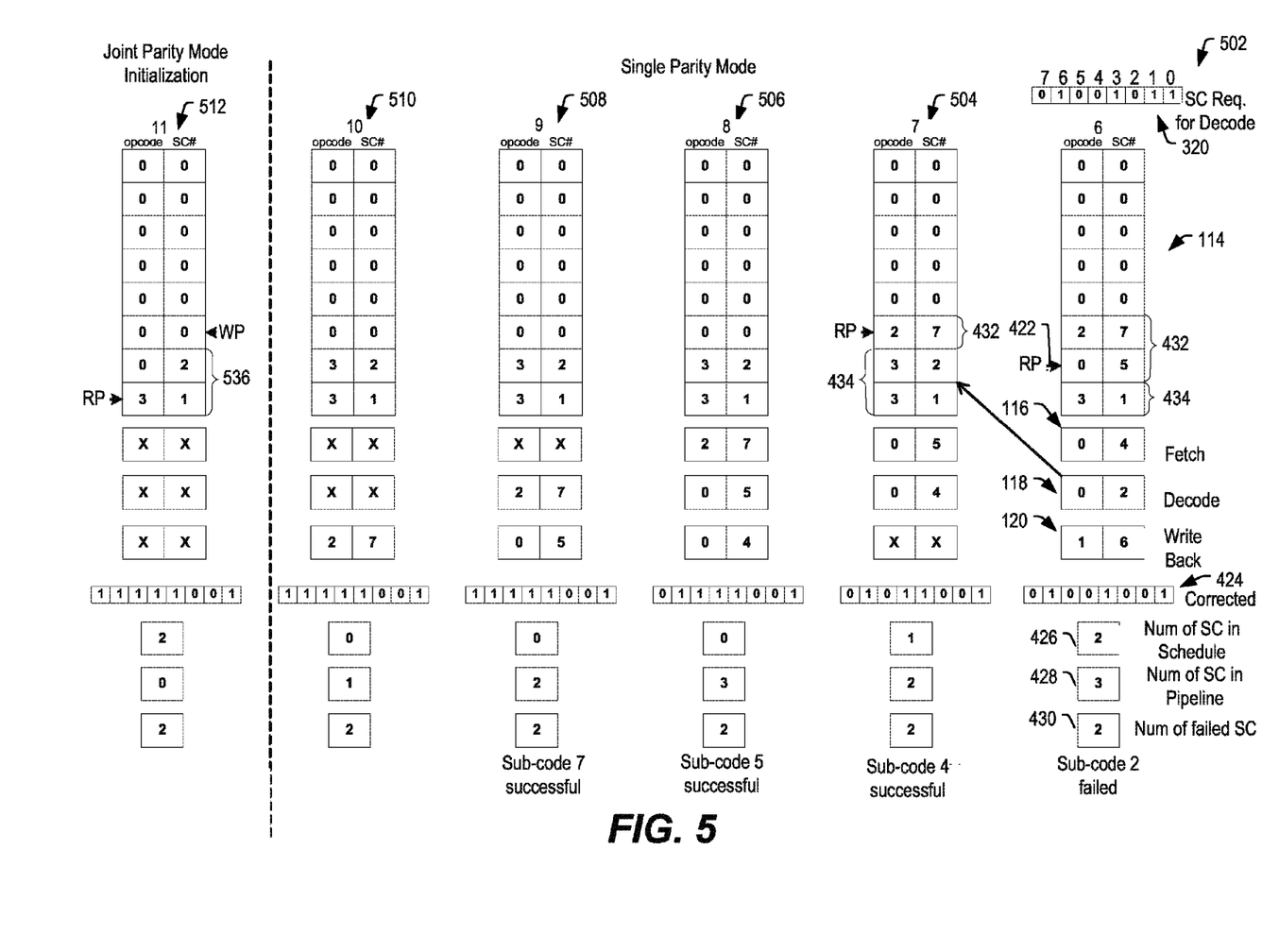
FIG. 5 is a diagram that illustrates a particular embodiment of operation of the schedule-based ECC decode controller of FIG. 2 following the operation of FIG. 4 and including initializing a second phase of multi-phase decoding.

Referring to FIG. 5, a sixth pipeline cycle 502 is illustrated as including the control register 320, the schedule 114, including the combined stack 432 over the third stack 434, the fetch stage 116, the decode stage 118, the write back stage 120, and the register 424 indicating uncorrected sub-codes. The operation command "1 6" has been passed (from the decode stage 118) to the write back stage 120. The operation code "0 2" has been passed (from the fetch stage 116) to the decode stage 118 for decode processing. An operation code "0 4" has been popped from the combined stack 432 and provided to the fetch stage 116. The read pointer 422 points to the bottom of the combined stack 432. The combined stack 432 has two entries and sits over the third stack 434. The third stack 434 has the single entry "3 1," indicating that sub-code 1 has failed, and with the opcode 3 that indicates that sub-code 1 is to be decoded using a joint parity decode process where additional parity bits for sub-code 1 are unknown and initialized to zero values.

During decoding of sub-code 2 at the decode stage 118, a decoding error may occur due to a number of errors in sub-code 2 exceeding an error correction capability of the single parity ECC decode. As a result, the "0 2" operation command may be sent back to a top of the third stack 434 (illustrated in a seventh pipeline cycle 504). The first indicator 426 has a value of 2, the second indicator 428 has a value of 3, and the third indicator 430 (a number of failed sub-codes) is incremented to 2.

During the seventh pipeline cycle 504, the write back stage 120 is idle. The decode stage 118 has the operation command "0 4" and the fetch stage 116 has an operation command "0 5" popped from the combined stack 432. The combined stack 432 has a single element (operation command "2 7") and the third stack 434 has two entries: a "3 1" entry corresponding to sub-code 1 and a "3 2" entry corresponding to sub-code 2. The register 424 is updated to indicate that sub-code 4 has been successfully decoded. The first indicator 426 is decremented to a value of 1, the second indicator 428 has a value of 2 as a result of the decode failure of sub-code 2, and the third indicator 430 has a value of 2.

At an eighth pipeline cycle 506, the write back stage 120 has received the operation command "0 4" from the decode stage 118. The decode stage 118 has been passed the operation command "0 5" from the fetch stage 116. The fetch stage 116 has received the final entry ("2 7") popped from the combined stack 432. The schedule 114 now includes only the third stack 434 of sub-codes that have failed decoding. The register 424 is updated to indicate that sub-code 5 has been successfully decoded. The first indicator 426 has a 0 value, indicating that no sub-codes remain to be decoded from the initial population of the schedule 114. The second indicator 428 has a value of 3, and the third indicator 430 has the value of 2.

At a ninth pipeline cycle 508, the write back stage 120 receives the operation command "0 5" corresponding to the successfully decoded sub-code 5. The decode stage 118 receives the operation command "2 7." The operation code 2 7 corresponds to the final sub-code originally loaded into the schedule 114 and may be successfully decoded during the ninth pipeline cycle 508. The fetch stage 116 is idle. The pipeline stages 116-120 may be allowed to empty to complete processing of all initial sub-code processing, prior to changing decoding modes to effect joint parity decoding. As a result, successful decoding of sub-code 7 causes the register 424 to be updated to a value indicating that sub-codes 1 and 2 were not decoded successfully, and that sub-codes 0 and 3-7 have been decoded successfully. The first indicator 426 remains at 0, the second indicator 428 is reduced to 2, and the third indicator 430 remains at 2.

During a tenth pipeline cycle 510, the write back stage 120 has received the "2 7" command operation from the decode stage 118. The decode stage 118 and the fetch stage 116 are idle. The first indicator 426 remains at 0, the second indicator 428 is decremented to 1, and the third indicator 430 remains at 2.

A joint parity mode initialization cycle 512 illustrates an initialization to enable decode operations using extended parity to attempt to decode sub-code 1 that was originally requested and that was uncorrectable during decoding at the third pipeline cycle 408 of FIG. 4 using only first parity. In the joint parity mode initialization cycle 512 (at pipeline cycle 11), the fetch stage 116, the decode stage 118, and the write back stage 120 are idle. The register 424 remains unchanged, the third indicator 430 is used to update the first indicator 426, the first indicator 426 has a 2 value, the second indicator 428 has a 0 value, and the third indicator 430 is no longer in use for joint parity mode. The first indicator 426 has the 2 value indicating that two sub-codes are in the schedule 114 to be decoded using joint parity mode. A read pointer indicates a bottom of a stack and a first sub-code for processing, and a write pointer indicates a top of stack into which failed decode operation commands may be returned into the schedule 114, switching the data structure in the schedule 114 from a stack (i.e. the third stack 434) to a FIFO 536. The last sub-code in the schedule 114, illustrated as sub-code 2, has its opcode changed from 3 to 0. For example, having an opcode of 3 may instruct a decoder to provide an all-0 value of joint parity bits for the sub-code when determining an ECC decode of the sub-code. Having a 0 opcode value during the joint parity mode may correspond to an instruction to calculate the joint parity bits.

Figure 6:
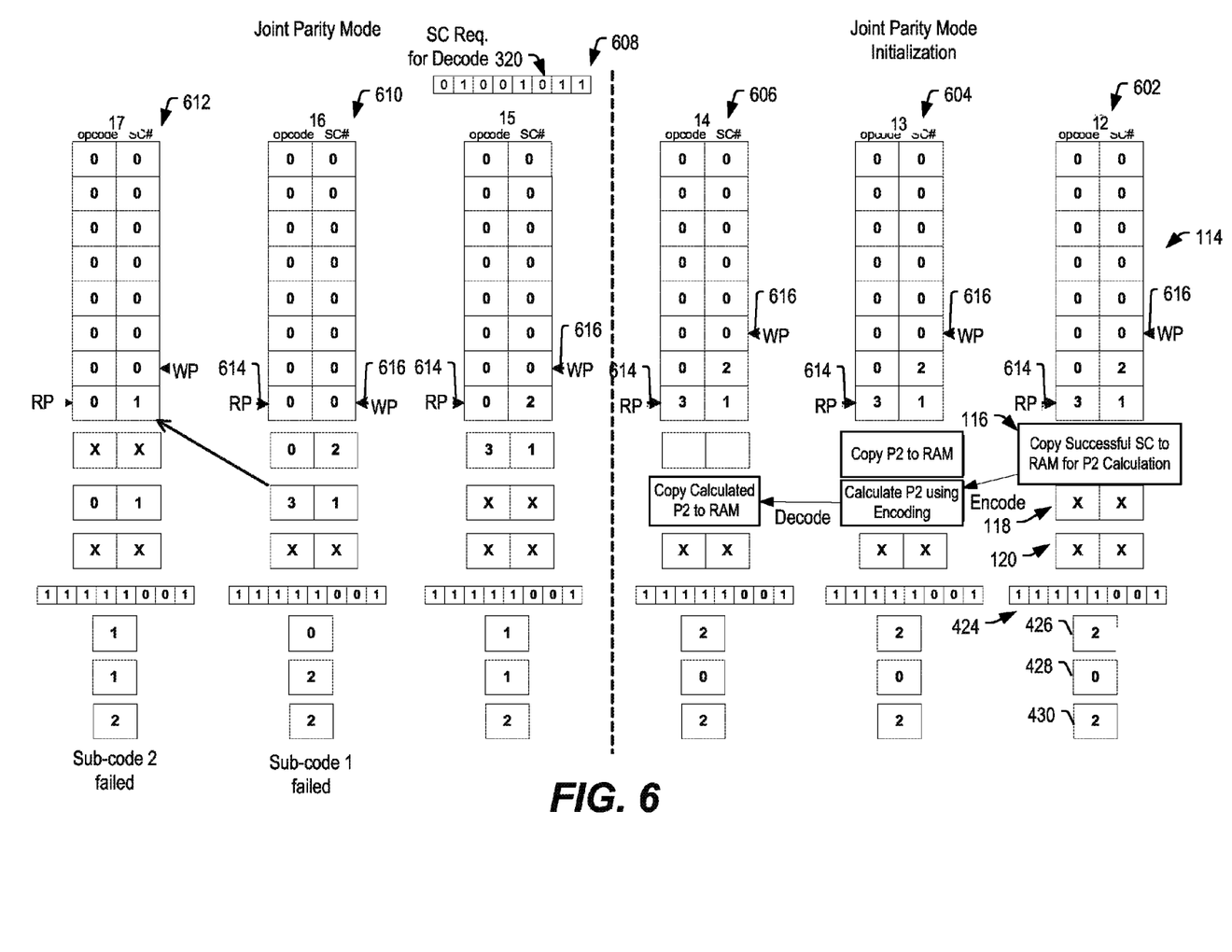
FIG. 6 is a diagram that illustrates a particular embodiment of operation of the schedule-based ECC decode controller of FIG. 2 following the operation of FIG. 5 and including performing the second phase of the multi-phase decoding.

Initialization of the joint parity mode continues in FIG. 6. In a twelfth pipeline cycle 602, the schedule 114 includes the command operation "3 1," at a location indicated by a read pointer 614, and a command operation "0 2" that is a last entry in the schedule 114. A write pointer 616 indicates the FIFO write pointer for writing additional entries to the schedule 114. The decode stage 118 and the write back stage 120 remain idle. The register 424 and the indicators 426-430 remain unchanged from the prior pipeline stage.

The fetch stage 116 fetches for encoding all of the sub-codes that were correctly decoded in the single parity decode mode. The list of the sub-codes is provided in the register 424 of corrected sub-codes. For example, each of the corrected sub-codes indicated in the register 424 may be fetched and provided to an encoder, such as the encoder 256 of FIG. 2, for generation of extended parity bits. As compared to an ECC decoding process, an ECC encoding process may be relatively fast to perform and consumes less power. As a result, extended parity bits may be computed, during a single pipeline cycle, for all of the sub-codes that have been correctly decoded.

In a thirteenth pipeline cycle 604, the decode stage 118 is used to control encoding of the successfully decoded sub-codes that were fetched during the fetch stage 116 of the twelfth pipeline cycle 602. The decode stage 118 also performs calculations to generate extended parity bits ("P2") for use in decoding the undecoded sub-codes. The fetch stage 116 fetches the joint parity bits that were stored during original encoding, such as in the memory 104 of FIG. 1. At a fourteenth pipeline cycle 606, the fetch stage 116 is idle and the decode stage 118 copies calculated joint parity bits into a memory to be accessible for decode operations.

At a fifteenth pipeline cycle 608, decode processing begins in a joint parity mode. The control register 320 indicates the required sub-codes for decoding. The fetch stage 116 receives the operation code "3 1" popped from the stack in the schedule 114 at the read pointer 614. The write pointer 616 shifts to indicate a new top of the FIFO 536. Because the read pointer 614 remains at the bottom of the schedule 114 and the write pointer 616 remains above a top entry of the schedule 114, the schedule 114 is operated as a first-in-first-out (FIFO) data structure. The first indicator 426 indicates one sub-code in the schedule 114 and the second indicator 428 indicates one sub-code in the pipeline.

Processing in the joint parity mode continues in a sixteenth pipeline cycle 610, where the decode stage 118 has received the "3 1" operation command from the fetch stage 116. The fetch stage 116 has received the "0 2" operation command from the schedule 114. The schedule 114 is empty, as all uncorrected sub-codes have entered the pipeline. The first indicator 426 has a 0 value, indicating the schedule 114 is empty. The second indicator 428 has a 2 value, indicating that two sub-codes are in the pipeline.

During decode processing of the "3 1" operation command, an ECC failure may be encountered. As a result, the "3 1" operation code may be written to the schedule 114 as "0 1" at a location of the write pointer 616 for additional processing, illustrated in a seventeenth pipeline cycle 612.

In the seventeenth pipeline cycle 612, the schedule 114 includes an operation command corresponding to sub-code 1, with the opcode changed from a 3 value to a 0 value, indicating that joint parity bits are to be calculated because the sub-code is the last sub-code in the schedule 114. The fetch stage 116 is idle, the decode stage 118 has received the "0 1" instruction command from the fetch stage 116, and the write back stage 120 is idle. The first indicator 426 indicates that one sub-code is in the schedule 114 and the second indicator 428 indicates that one sub-code is in the pipeline.

In contrast to the single parity mode where failed sub-codes are returned to the schedule 114 at the read pointer address, pushing up unprocessed sub-codes and generating a stack-over-stack data structure, in the joint parity mode the read pointer 614 may remain pointing to a lowest entry of the schedule 114. Failed sub-codes are written to back the schedule 114 at the write pointer 616 to be reprocessed. As long as sub-codes remain in the schedule 114 (i.e. including failed attempts to decode sub-codes during the joint parity mode that are returned to the schedule 114), the joint parity mode may continue. Because the joint parity mode may be an iterative LDPC decoding process that may include iteratively updating the joint parity bits, the joint parity mode may continue until all sub-codes have been successfully decoded, or until reaching a predetermined time limit or number of processing cycles.

Figure 7:
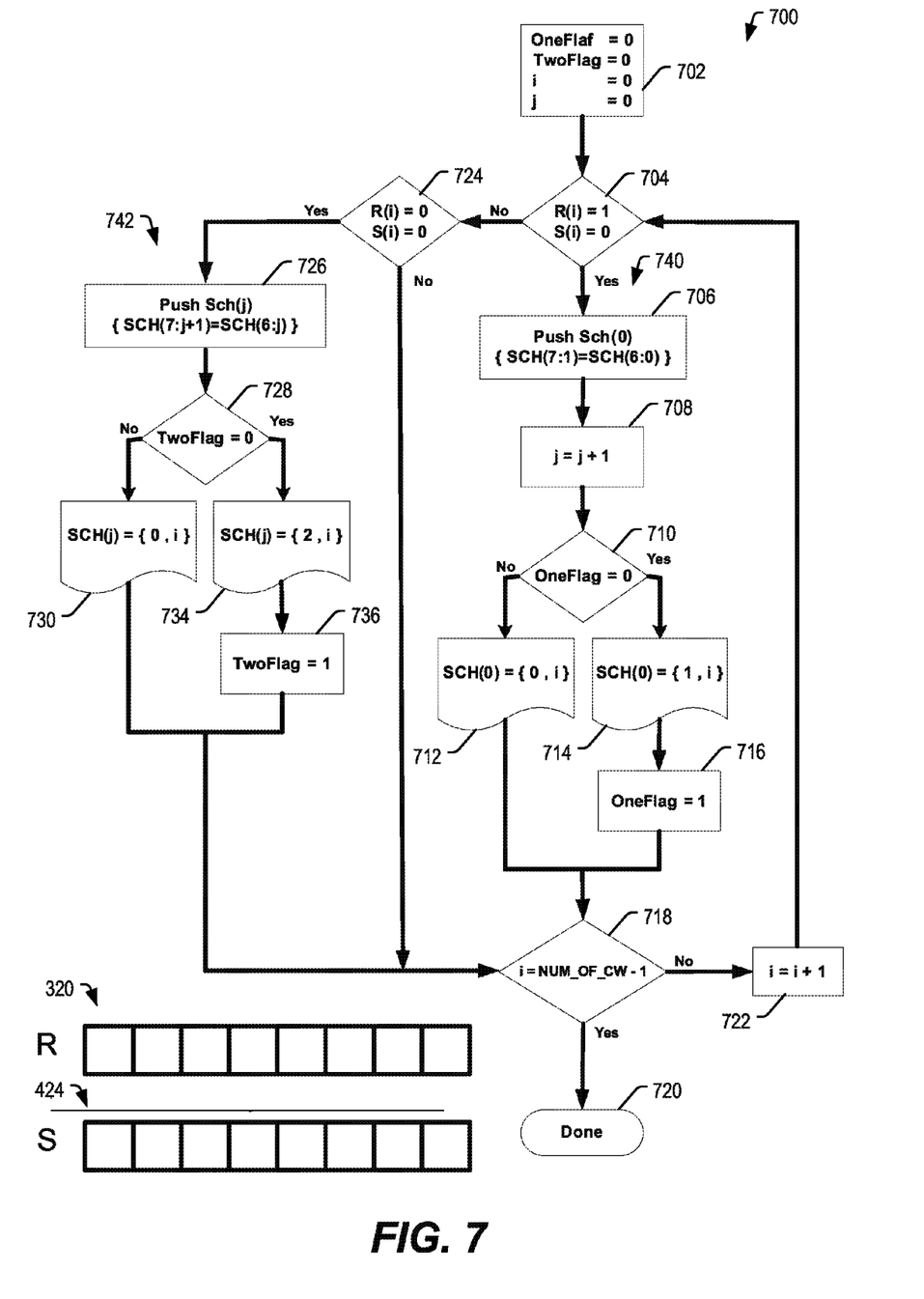
FIG. 7 is a flow diagram of a particular embodiment of a method of populating a schedule of the schedule-based ECC decode controller of FIG. 1 for multi-phase decoding.

Referring to FIG. 7, a flowchart of a particular embodiment of initiating a scheduler is depicted and designated 700. The method 700 includes an initialization of parameters including initializing a "oneflag" parameter to 0, a "twoflag" parameter to 0, an "i" index to 0, and a "j" index to 0, at 702. The i index may correspond to the read pointer of the control register 320 of FIG. 3, and the j index may correspond to a write pointer for the second stack 326 of FIG. 3. A determination is made whether the ith sub-code is requested to be decoded and whether the ith sub-code has been successfully decoded, at 704. Determining whether the ith sub-code is requested to be decoded may be performed by determining a bit value of the ith bit position of the control register 320. Determining whether the ith sub-code has been successfully decoded may be determined by accessing the ith bit position of the register 424 corresponding to indications of corrected sub-codes.

In response to determining that the ith sub-code is requested to be decoded and has not been successfully decoded, processing advances along a first path 740 to initiate requested sub-codes, and an entry corresponding to the ith sub-code is pushed into the schedule (e.g. the schedule 114) at a lowest entry position of the schedule, at 706. Each of the entries that may be in the schedule when the ith entry is pushed into the 0 schedule position is pushed up one position in the schedule, such that entries in the schedule at positions 0-6 may be pushed into positions 1-7. A value of j is incremented, at 708, pushing up the entire upper stuck of non requires SCs with their pointer, and a determination is made whether the oneflag parameter has a 0 value, at 710.

In response to determining that the oneflag parameter does not have a 0 value, the entry that has been pushed into the 0 entry position of the schedule is provided with an opcode of 0 and a sub-code number of i ("0 i") at 712. Otherwise, the entry pushed into the 0 entry of the schedule is provided with an opcode of 1 and a sub-code number of i, at 714, and the oneflag parameter set to 1 indicating that this is the last required SC, at 716.

After adding the entries to position 0 of the schedule, a determination is made whether sub-code i is a final sub-code of received data by determining whether i is one less than a total number of codewords, at 718. In response to i being a final sub-code to be processed, the method ends, at 720. Otherwise, i is incremented, at 722, and processing returns to 704.

At 704, in response to a determination that the ith element is either not requested for decoding or has already been successfully decoded, or both, a determination is made whether the ith sub-code is not requested for decoding and also has not been successfully decoded, at 724. In response to determining that the ith sub-code is not requested for decoding and has not been successfully decoded, processing advances to a second path 742 to initiate non-requested sub-codes, at 726. Otherwise, processing returns to 718, where determination is made whether a sub-code i is a last sub-code having an entry that has been loaded into the scheduler.

At 726, a push is performed in the schedule at a position j in the schedule. For example, elements of the schedule from position 6 to position j may be pushed to occupy position 7 to position j+1. A determination is made whether the value of the parameter twoflag is 0, at 728. In response to determining that the value of the parameter twoflag is not equal to 0, position j of the schedule may be populated with the operation command "0 i" at 730. Alternately, when the value of twoflag is equal to 0, position j of the schedule may be populated with the instruction command "2 i" at 734, indicating that the jth sub-code is the last non-requested, non-decoded sub-code in the schedule. The twoflag parameter set to a value of 1, at 736, and a determination is made whether i represents a final codeword to be decoded, at 718.

The method 700 therefore illustrates a process to enable population of a schedule, such as the schedule 114, according to a decode order of the sub-codes in received data, and may be used to populate the first stack 324 and the second stack 326 in a stack-on-stack configuration during the initialization cycle 302 of FIG. 3. The schedule 114 may be operated according to a stack-on-stack data structure when the schedule 114 is being populated, according to a stack data structure upon initiating decode of the data chunks, according to the stack-on-stack data structure in response to one or more of the sub-codes failing decode during a first decoding phase, and according to a first-in-first-out (FIFO) data structure during a second decoding phase. Populating the requested and the non-requested sub-codes may be performed in a single pass over the control register 320 of FIG. 3. Populating the schedule may be self-initialized by the ECC controller and the decoding may be performed according to the schedule in a self-sustained decode operation of the ECC controller.

Figure 8:
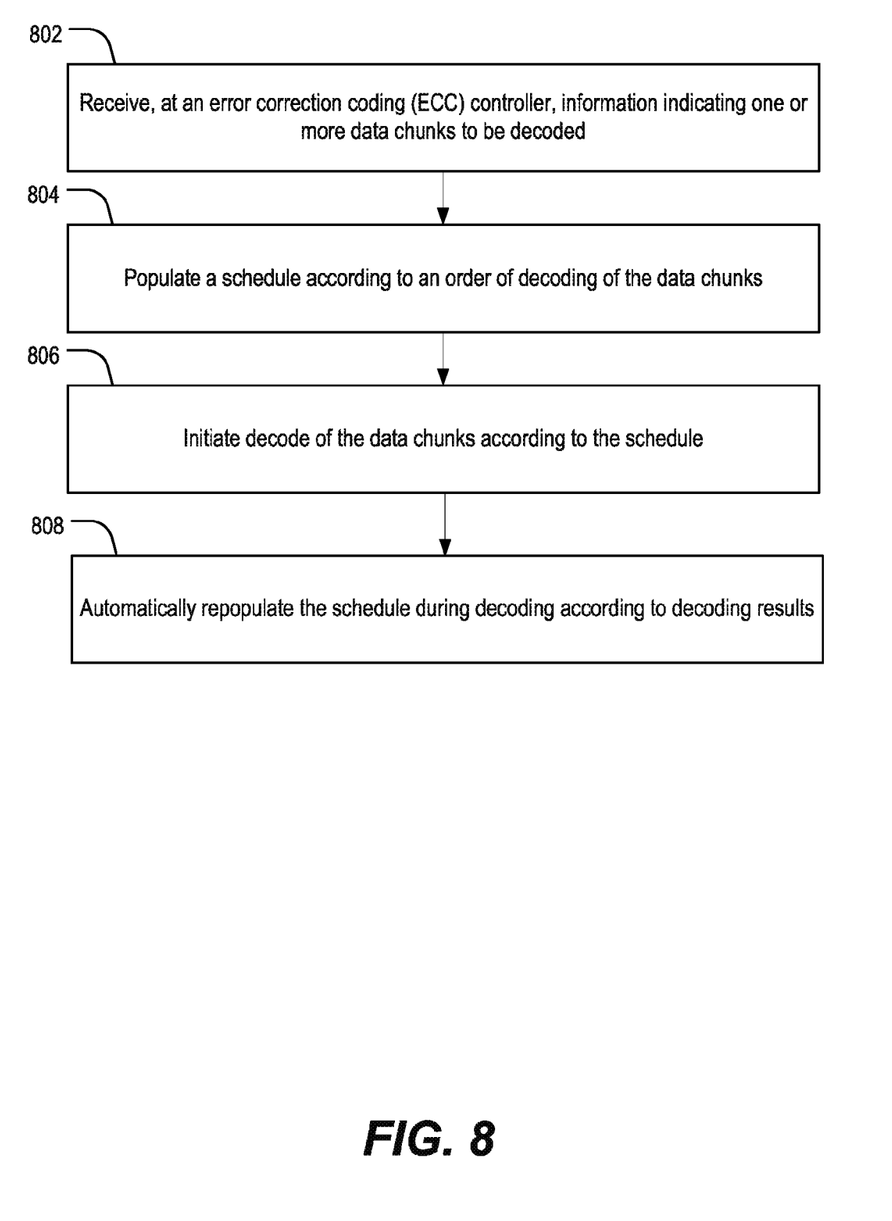
FIG. 8 is a flow diagram of a particular embodiment of a method of schedule-based ECC decode operation.

Referring to FIG. 8, a flow diagram of a particular embodiment of a method of schedule-based ECC decode operation is illustrated. The method may be performed at a data storage device, such as the data storage device 102 of FIG. 1.

The method includes receiving, at an error correction coding (ECC) controller, information indicating one or more data chunks to be decoded, at 802. For example, the information may include a list of the data chunks c0-c3 of the read data 106 of FIG. 1 to be decoded.

A schedule is populated according to an order of decoding of the data chunks, at 804. For example, the schedule 114 may be populated with entries according to a decode order in a single-phase decoder implementation, such as illustrated in FIG. 1. As another example, the schedule 114 may be populated with entries according to a decode order in a multi-phase decoder implementation, such as illustrated in FIG. 3.

Decode of the data chunks is initiated according to the schedule, at 806. Initiating decode of the data chunks according to the schedule may include selecting a particular data chunk to be decoded according to the order of decoding, such as a data chunk corresponding to an entry at a read pointer location, such as the read pointer 422 of FIG. 4. Initiating decode of the data chunks may also include instructing a fetch stage of the ECC controller, such as the fetch stage 116, to fetch the particular data chunk. The schedule may be automatically repopulated during decoding according to decoding results, at 808. For example, entries may be added to the schedule for data chunks that failed decode operations, such as in the third stack 434 of FIG. 4, or in the FIFO 536, such as illustrated in cycles 610-612 of FIG. 6.

The ECC controller may be coupled to a single decoding unit. Alternatively, the ECC controller may be coupled to multiple decoding units, such as the decoders 252 and 254 of FIG. 2. When multiple decoders are used, initiating decode of the data chunks may include selecting at least one of the data chunks to be decoded at a first decoding unit and selecting another of the data chunks to be decoded at a second decoding unit. For example, the decode stage 118 may select one data chunk fetched to the first RAM portion 262 to be decoded by the first decoder 252 of FIG. 2 and another data chunk fetched to the second RAM portion 264 to be decoded by the second decoder 254 of FIG. 2.

The fetch stage may load the particular data chunk to a first memory location that is accessible to a decoding unit, such as one of the RAM portions 262-266 of FIG. 2. During a decoding stage, such as the decoding stage 118 of FIG. 2, the decoding unit may be instructed to access the first memory location to perform decoding. During a writeback stage, such as the write back stage 120 of FIG. 2, a decoding result from the first memory location may be copied to a system memory. The particular data chunk may be loaded to the first memory location during the fetch stage while another data chunk in a second memory location is processed by the decoding unit and while a third data chunk is being written to system RAM, to enable pipelined processing, such as described with respect to FIGS. 2-6.

A schedule entry for a particular data chunk may include an opcode and a chunk identifier, such as described with respect to FIG. 2. The opcode may indicate a status of the particular data chunk. To illustrate, an opcode of '1' may indicate that an entry in the schedule corresponds to a data chunk that is requested to be decoded and that is the last requested data chunk in the decoding order, and an opcode of '2' may indicate an entry in the schedule corresponds to a data chunk that is the last non-requested data chunk in the decoding order.

The data chunks may be portions of a read data unit of a memory device. A list of indicators that indicate a decoding status of each data chunk of the read data unit may be maintained, such as the bit values in the register 424 of FIG. 4 that indicate whether each sub-code has been successfully decoded. In addition, or alternatively, a list of indicators that indicate whether each particular data chunk of the read data unit is requested for decode or not requested for decode may be maintained, such as the bit values in the control register 320.

Populating the schedule may include populating a first stack with entries corresponding to data chunks of the read data that are requested for decode and with entries corresponding to data chunks of the read data that are not requested for decode. For example, the schedule 114 is populated in FIG. 3 with entries corresponding to requested sub-codes 0, 1, 3, and 6, followed by non-requested sub-codes 2, 4, 5, and 7.

Populating the schedule may include adding one or more entries to the schedule, and each of the one or more entries may correspond to an associated data chunk. The schedule may be maintained as a stack, and a particular entry may be removed from the stack in response to initiating decode of the data chunk corresponding to the particular entry. For example, the entry corresponding to the data chunk c0 of FIG. 1 is removed from the stack in the schedule 114 and the fetch stage 116 initiates fetching of the data chunk c0 for decoding.

Decoding of the data chunks may be initiated by initiating decode of the data chunks that are requested for decode according to a stack order of the first stack, such as the requested sub-codes 0, 1, 3, and 6 illustrated in FIG. 3. In some embodiments, a single decoding phase is implemented and undecodable data chunks are treated as unrecoverable data. In other embodiments, multi-phase decoding may be implemented and data chunks that are undecodable in a first decoding mode may be retained for additional processing in a second decoding mode by adding entries to the schedule corresponding to the undecodable sub-codes.

As an example of a multi-phase decoding implementation, in response detecting one or more of the data chunks that are requested for decode are undecodable using first parity bits of the one or more data chunks (e.g. the sub-code 1 in pipeline cycle 408 of FIG. 4), a third stack may be populated in the schedule with one or more entries corresponding to the one or more undecodable data chunks, such as the third stack 434 of FIG. 4. Decoding of each of the data chunks that are not requested for decode may be initiated according to a stack order of the first stack, such as illustrated in the pipeline cycles 410 and 412 of FIG. 4 and the pipeline cycles 502 and 504 of FIG. 5. Additional parity bits may be generated for each decoded data chunk of the read data, such as the P2 bits generated in the pipeline cycle 604 of FIG. 6. A second decode of each of the undecodable data chunks may be initiated according to a stack order of the third stack, such as for the sub-codes 1 and 2 as illustrated in pipeline cycles 608 and 610 of FIG. 6. The second decode may use second parity bits based on the additional parity bits (e.g. the calculated P2 of all sub-codes of FIG. 6, which may be continually updated during decoding operations).

Updating the schedule according to a progress of decoding the data chunks may enable debugging of the controller based on the schedule. For example, an order of data chunks to be decoded and an opcode corresponding to each chunk may be examined during decoding to verify correct processing of the ECC decode controller 110 of FIG. 1.

Although various components depicted herein are illustrated as block components and described in general terms, such components may include one or more microprocessors, state machines, or other circuits configured to enable a data storage device, such as the data storage device 102 of FIG. 1, to perform the particular functions attributed to such components, or any combination thereof. For example, the ECC decode controller 110 of FIG. 1 may represent physical components, such as processors, state machines, logic circuits, or other structures to enable populating the schedule 114 and to initiate decode processing according to the schedule 114.

The ECC decode controller 110 may be implemented using a microprocessor or microcontroller programmed to populate the schedule 114 and to initiate decode processing according to the schedule 114. In a particular embodiment, the ECC decode controller 110 includes a processor executing instructions that are stored at the memory 104. Alternatively, or in addition, executable instructions that are executed by the processor may be stored at a separate memory location that is not part of the memory 104, such as at a read-only memory (ROM).

In a particular embodiment, the data storage device 102 may be a portable device configured to be selectively coupled to one or more external devices. For example, the data storage device 102 may be a removable device such as a universal serial bus (USB) flash drive, SSD or removable memory card. However, in other embodiments, the data storage device 102 may be attached or embedded within one or more host devices, such as within a housing of a portable communication device. For example, the data storage device 102 may be within a packaged apparatus, such as a wireless telephone, a personal digital assistant (PDA), a gaming device or console, a portable navigation device, a computer, or other device that uses internal non-volatile memory. In a particular embodiment, the data storage device 102 includes a non-volatile memory, such as a Flash memory (e.g., NAND, NOR, Multi-Level Cell (MLC), Divided bit-line NOR (DINOR), AND, high capacitive coupling ratio (HiCR), asymmetrical contact-less transistor (ACT), or other Flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   at a data storage device, performing:
      receiving, at an error correction coding (ECC) controller, information indicating a plurality of data chunks to be decoded;
      populating a schedule according to an order of decoding the plurality of data chunks, wherein the schedule is maintained as a stack, wherein each of the plurality of data chunks is associated with a stack entry, and wherein a stack pointer references one of the stack entries; and
      initiating decoding of the data chunks according to the schedule, wherein a first data chunk, according to the order of decoding, is loaded to a first memory location during a fetch stage while a decoding unit accesses a second memory location of a plurality of memory locations accessible to the decoding unit and processes a second data chunk stored at the second memory location, and wherein the second data chunk was loaded into the second memory location before the decoding unit accessed the second memory location to process the second data chunk.

2. The method of claim 1, wherein populating the schedule is self-initialized by the ECC controller and wherein the data chunks are decoded according to the schedule in a self-sustained decode operation of the ECC controller.

3. The method of claim 1, further comprising updating the schedule according to a progress of decoding the data chunks to enable debugging of the ECC controller with reference to entries in the schedule.

4. The method of claim 1, wherein the ECC controller is coupled to a single decoding unit.

5. The method of claim 1, wherein the ECC controller is coupled to multiple decoding units, and wherein initiating decoding of the data chunks includes selecting at least one of the data chunks to be decoded at a first decoding unit and selecting another of the data chunks to be decoded at a second decoding unit.

6. The method of claim 1, wherein populating the schedule includes adding one or more entries to the stack wherein each of the one or more added entries is associated with an added data chunk.

7. The method of claim 6, wherein a particular entry is removed from the stack in response to initiating decoding of the data chunk corresponding to the particular entry.

8. The method of claim 1, wherein initiating decoding of the data chunks according to the schedule includes selecting the first data chunk to be decoded according to the order of decoding and instructing the fetch stage of the ECC controller to fetch the first data chunk.

9. The method of claim 8, wherein the fetch stage loads the first data chunk to the first memory location that is one of the plurality of memory locations accessible to the decoding unit.

10. The method of claim 9, further comprising, during a decoding stage, instructing the decoding unit to access the first memory location to perform decoding.

11. The method of claim 10, further comprising, during a write back stage, copying a decoding result from the first memory location to a system memory.

12. The method of claim 1, wherein a schedule entry in the schedule for the first data chunk includes an opcode and a chunk identifier.

13. The method of claim 12, wherein the opcode indicates a status of the first data chunk.

14. The method of claim 1, wherein the data chunks are portions of data read from a memory device during a read operation.

15. The method of claim 14, further comprising maintaining a list of indicators that indicate a decoding status of each data chunk of the read data.

16. The method of claim 14, further comprising maintaining a list of indicators that indicate whether each particular data chunk of the read data is requested for decode or not requested for decode.

17. The method of claim 16, wherein populating the schedule includes populating a first stack with entries corresponding to data chunks of the read data that are requested for decode and populating a second stack with entries corresponding to data chunks of the read data that are not requested for decode.

18. The method of claim 17, wherein the stack is configured to perform a stack operation that includes one of a read operation, a pop operation, or a push operation.

19. The method of claim 18, further comprising, in response to detecting that one or more of the data chunks that are requested for decode are undecodable using first parity bits of the one or more data chunks:
    populating a third stack in the schedule with one or more entries corresponding to the one or more undecodable data chunks;
    initiating decoding of each of the data chunks that are not requested for decode according to a stack order of the second stack;
    generating additional parity bits for each decoded data chunk of the read data; and
    initiating a second decoding of each of the undecodable data chunks according to a stack order of the third stack, wherein the second decode uses second parity bits based on the additional parity bits.

20. The method of claim 1, wherein the schedule is operated according to a stack-on-stack data structure during population of the schedule, according to a stack data structure upon initiating decode of the data chunks, according to the stack-on-stack data structure in response to one or more of the data chunks failing decode during a first decoding phase, and according to a first-in-first-out (FIFO) data structure during a second decoding phase.

21. A data storage device comprising:
    a memory;
    an error correction coding (ECC) controller configured to:
        receive information indicating a plurality of data chunks associated with the memory to be decoded;
        populate a schedule according to an order of decoding the plurality of data chunks, wherein the schedule is maintained as a stack, wherein each of the plurality of data chunks is associated with a stack entry of the stack, and wherein a stack pointer references one of the stack entries; and
        initiate decode of the data chunks according to the schedule; and
    a first ECC decoding unit responsive to the ECC controller, wherein a first data chunk according to the order of decoding is loaded to a first memory location during a fetch stage while the first ECC decoding unit accesses a second memory location of a plurality of memory locations accessible to the first ECC decoding unit and processes a second data chunk stored at the second memory location, wherein the second data chunk was loaded into the second memory location before the first ECC decoding unit accessed the second memory location to process the second data chunk.

22. The data storage device of claim 21, wherein the first ECC decoding unit includes a low-density parity check (LDPC) decoding unit and wherein the ECC controller is configured to control a multi-phase pipelined LDPC decode operation at the LDPC decoding unit.

23. The data storage device of claim 21, further comprising a second ECC decoding unit, and wherein initiating decode of the data chunks includes selecting at least one of the data chunks to be decoded at the first ECC decoding unit and selecting another of the data chunks to be decoded at the second ECC decoding unit.

24. The data storage device of claim 21, wherein populating the schedule includes adding one or more entries to the schedule, each of the one or more entries corresponding to an associated data chunk, wherein a particular entry is popped from the stack in response to initiating decode of the data chunk corresponding to the particular entry.

25. The data storage device of claim 21, wherein initiating decode of the data chunks according to the schedule includes selecting a first data chunk to be decoded according to the order of decoding and instructing a fetch stage of the ECC controller to fetch the first data chunk, wherein the fetch stage loads the first data chunk to the first memory location of the plurality of memory locations accessible to the first ECC decoding unit.

26. The data storage device of claim 25, wherein the ECC controller is configured to, during a decoding stage, instruct the first ECC decoding unit to access the first memory location to perform decoding.

27. The data storage device of claim 21, wherein the ECC controller is configured to, during a write back stage, copy a decoding result from the second memory location to a system memory.

28. A method comprising:
at a data storage device, performing:
populating, by an error correction coding (ECC) controller, a schedule according to an order of decoding a plurality of data chunks requested for decoding, wherein the schedule for the data chunks requested for decoding is maintained as a first stack, wherein each of the plurality of data chunks requested for decoding is associated with a first stack entry, and wherein a second stack maintains one or more second stack entries corresponding to one or more data chunks not requested for decoding; and
in response to detecting that one or more data chunks requested for decoding are undecodable using first parity bits of the one or more data chunks requested for decoding:
populating a third stack in the schedule with one or more entries corresponding to the one or more undecodable data chunks;
initiating decode of each of the data chunks that are not requested for decode according to a stack order of the second stack;
generating additional parity bits for each decoded data chunk of the read data; and
initiating a second decode of each of the undecodable data chunks according to a stack order of the third stack, wherein the second decode uses second parity bits based on the additional parity bits.

29. The method of claim 28, wherein the first stack, the second, and the third stack are managed as a stack-over-stack data structure.

30. The method of claim 29, wherein the stack-over-stack data structure is operated according to a first-in-first-out (FIFO) data structure during the second decode.

31. A method comprising:
at a data storage device, performing:
receiving, at an error correction coding (ECC) controller, information indicating a plurality of data chunks to be decoded;
populating a schedule according to an order of decoding the plurality of data chunks, wherein the schedule is maintained as a stack, wherein each of the plurality of data chunks is associated with a stack entry, and wherein a stack pointer references one of the stack entries; and
initiating decoding of the data chunks according to the schedule,
wherein the schedule is operated according to a stack-on-stack data structure during population of the schedule, according to a stack data structure upon initiating decoding of the data chunks, according to the stack-on-stack data structure in response to one or more of the data chunks failing decoding during a first decoding phase, and according to a first-in-first-out (FIFO) data structure during a second decoding phase.

32. The method of claim 31, wherein populating the schedule further includes populating a first stack with entries corresponding to data chunks of read data that are requested for decode and populating a second stack with entries corresponding to data chunks of the read data that are not requested for decoding.

* * * * *